United States Patent [19]

Welsh

[11] 4,098,314
[45] Jul. 4, 1978

[54] EMERGENCY TRACTION APPARATUS FOR AUTOMOBILE WHEELS

[76] Inventor: Norman F. Welsh, 460 W. Lake Sammamish Pkway. NE., Bellevue, Wash. 98008

[21] Appl. No.: 689,556

[22] Filed: May 24, 1976

[51] Int. Cl.² .............................................. B60C 27/04
[52] U.S. Cl. .................................... 152/216; 152/218; 152/225 R
[58] Field of Search ............... 152/213 R, 213 A, 214, 152/216, 217–219, 225 R, 223–224, 239, 226–230; 301/40 R, 40 S, 41 R, 43, 44 R, 44 T, 45

[56] References Cited

U.S. PATENT DOCUMENTS

| | | | |
|---|---|---|---|
| 2,598,298 | 5/1952 | Pindjak | 152/230 |
| 2,806,503 | 9/1957 | Hamerski | 152/225 R |
| 2,837,133 | 6/1958 | Armenante et al. | 152/228 X |
| 2,886,091 | 5/1959 | Hines | 152/228 |
| 2,981,303 | 4/1961 | Hayes | 152/228 |
| 3,079,972 | 3/1963 | Forman | 152/225 R X |
| 3,114,407 | 12/1963 | Patterson | 152/223 X |
| 3,565,150 | 2/1971 | Carr | 152/218 |

FOREIGN PATENT DOCUMENTS 478,678  11/1969  Switzerland .................. 152/226

Primary Examiner—Allen N. Knowles
Assistant Examiner—Charles A. Marmor
Attorney, Agent, or Firm—Shapiro and Shapiro

[57] ABSTRACT

Emergency traction apparatus for temporary attachment to a vehicle wheel comprises a multiplicity of diametrical arms forming a unitary arm assembly with a common central pivot. The arms are interconnected by flexible couplings so that the assembly may be spread from a collapsed condition to form a stable radiating arm array by turning two of the arms about the pivot and then interconnecting them. Opposite ends of the arms have radially movable J-rods that overlie the tire tread when the arm assembly is applied to the side of a vehicle wheel. The J-rods are simultaneously engaged with the tire by a central tightening mechanism that moves the rods radially inward against the bias of springs that normally urge the rods radially outward to provide clearance for the easy application of the apparatus to the vehicle wheel.

16 Claims, 18 Drawing Figures

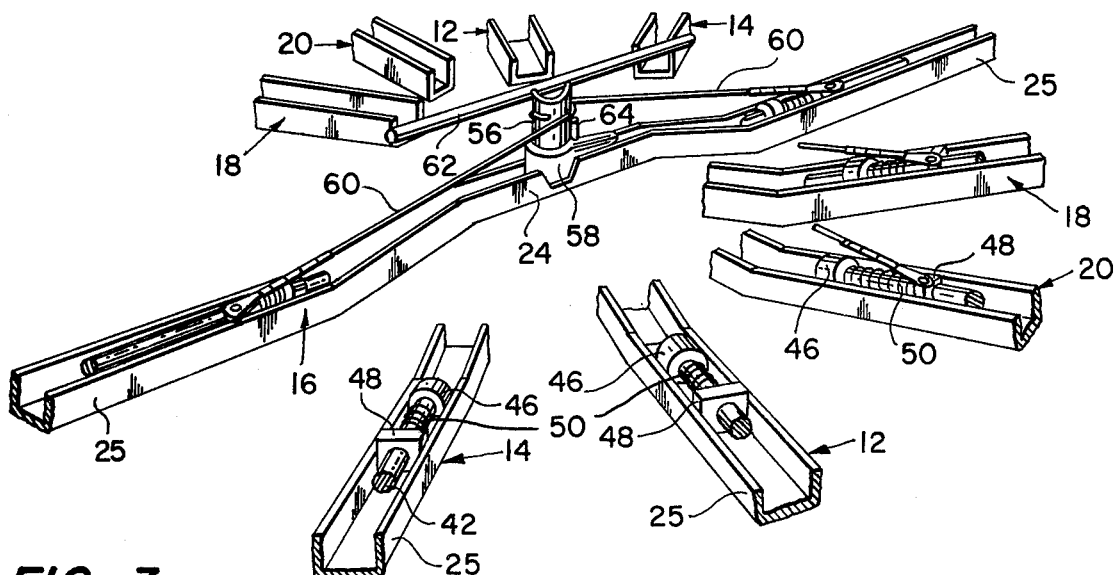
FIG. 3
FIG. 4
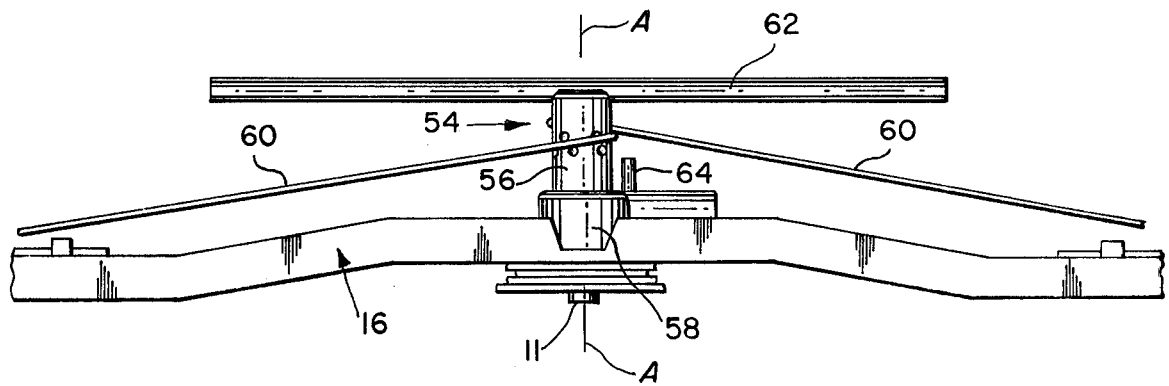
FIG. 5
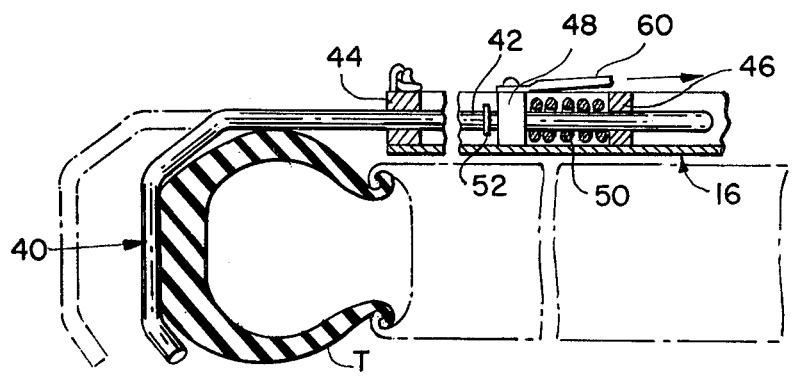

EMERGENCY TRACTION APPARATUS FOR AUTOMOBILE WHEELS

BACKGROUND OF THE INVENTION

This invention is concerned with emergency traction apparatus for vehicles, and more particularly with traction apparatus that can be conveniently stored until an emergency arises requiring added traction and then easily applied to, and later removed from, the wheel of a vehicle.

Emergency traction apparatus of the tire chain type commonly used on automobile wheels for providing better traction in snow or ice is difficult to attach to the wheels, usually requiring that the vehicle be lifted by a jack or moved along the ground to draw the chain about the tire. The prior art is replete with devices attempting to improve upon the tire chain. Typically, these devices employ an assembly of J-rods or the like which embrace the tire tread and which are coupled together by some mechanism or linkage. In general, such devices suffer from one or more of the following deficiencies:

1. Complexity, usually requiring multiple pieces that must be assembled in situ.
2. High cost.
3. Insufficient traction elements, such as J-rods.
4. Difficult application to the vehicle wheel, sometimes requiring movement of the wheel or the vehicle, especially when a significant part of the wheel is hidden by a fender or fender skirt.
5. Inadequate ability to maintain the device properly applied to the wheel when the vehicle is driven.
6. Inadequate ability to accommodate flattening of the tire as the wheel turns and to accommodate tire wear.
7. Inability to collapse to a convenient size and shape for storage.

BRIEF DESCRIPTION OF THE INVENTION

It is accordingly a principal object of the present invention to provide improved emergency traction apparatus for vehicles that overcomes or significantly alleviates the foregoing and other deficiencies of the prior art.

Briefly stated, from a broad standpoint the apparatus of the present invention comprises a unitary assembly of diametrical arms having a common central pivot, the arms being arranged so that the assembly may easily be spread from a collapsed condition to form a stable radiating arm array. The arms are interconnected by flexible couplings so that turning one of said arms relative to another arm about the pivot is effective to spread all of the arms. Opposite ends of the arms are provided with radially sliding J-rods which engage the tire tread concurrently when a central tightening mechanism is actuated, the J-rods normally being urged radially outward by biasing springs to provide installation clearance relative to the tire tread.

BRIEF DESCRIPTION OF THE DRAWINGS

The invention will be further described in conjunction with the accompanying drawings, which illustrate preferred and exemplary embodiments, and wherein:

FIG. 3 is a fragmentary perspective view illustrating details of the first embodiment;

FIG. 4 is a fragmentary plan view of a portion of the first embodiment;

FIG. 5 is a fragmentary sectional view illustrating the engagement of apparatus of the invention with a vehicle wheel;

DETAILED DESCRIPTION OF THE INVENTION

Figure 1:
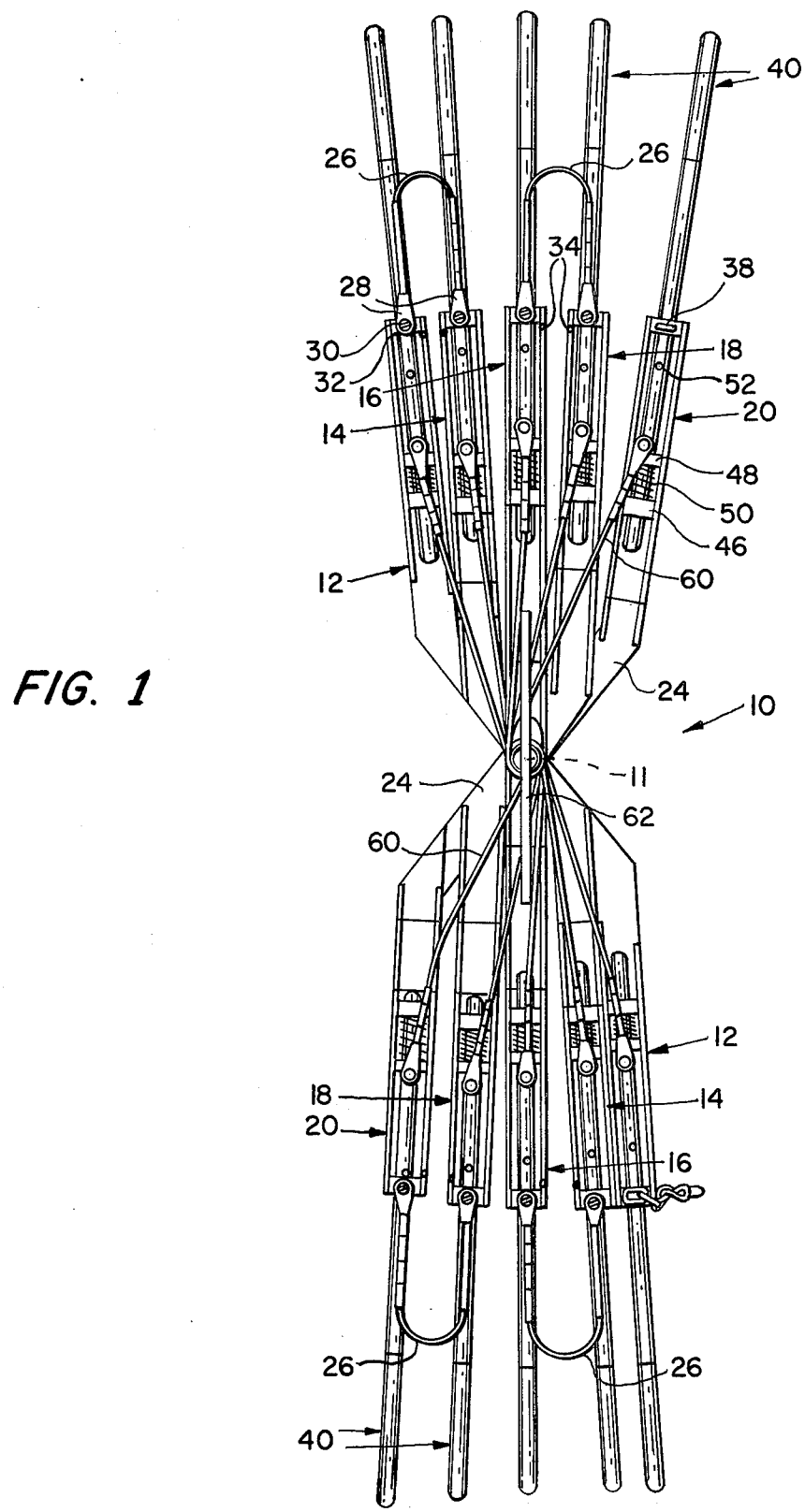
FIG. 1 is a side elevation view of a first embodiment of the invention, with the assembly of arms shown almost totally collapsed.

Referring to the drawings, and initially to FIGS. 1–5 illustrating a first embodiment, the apparatus of the invention comprises a plurality of generally diametrical arms forming a unitary assembly 10 with a common pivot 11, five such arms, 12, 14, 16, 18, and 20 being shown. Although a larger or a smaller number of arms may be employed, some of the advantages of the invention would be lost if only two diametrical arms were employed, as in the prior art. The term "generally diametrical" connotes arms that extend generally diametrically across a central pivot, as distinguished from radial arms that merely project from one side of a pivot. Except for arm 16, which is the central arm in the collapsed condition of the apparatus shown in FIG. 1, each of the arms is generally Z-shaped as projected upon a plane perpendicular to the pivot axis A (FIG. 4), with a rather flat central section, such as section 24 of arm 20, and with channel-shaped outer sections 25 (see FIG. 3). The term "generally Z-shaped" is intended to include a reverse Z-shape, and the Z-shape shown is, of course, a lazy Z-shape or zig-zag. Arms 14 and 18 are at opposite sides of arm 16 and are oppositely Z-shaped, while arms 12 and 20 are located at the side of arms 14 and 18 remote from arm 16, respectively, and are oppositely Z-shaped. The central arm 16 may be substantially straight as projected upon a plane perpendicular to axis A.

The central sections 24 of the various arms are stacked against the central section of arm 16, and the pivot 11, which may be a heavy bolt, for example, is inserted through a hole (not shown) in each central section and secured by a nut, for example. By virtue of the Z-shaped arm configuration, the arms may be brought together (even more closely than illustrated in FIG. 1) to provide a collapsed condition of the arm assembly 10 which occupies very little space. Yet the arms may be readily spread apart to form a radiating array as shown in FIG. 2. As is apparent in FIG. 2, the outer sections of each of the arms except arm 16 are misaligned and thus are not truly radial relative to the central pivot. This does not detract from the operational effectiveness of the apparatus, however.

As projected upon planes containing the axis A of pivot 11, the arms are preferably bent to the extent required so that the outer sections of the arms lie approximately in a common plane perpendicular to the pivot axis. The central arm 16 may be bent the most, as shown in FIG. 3, to accommodate the stacked central sections 24 of the arms, and the other arms bent to a smaller extent depending upon their position in the stack.

To facilitate deployment of the arms to the spread condition shown in FIG. 2 and to retain the arms in that condition, the arms are interconnected by flexible couplings, preferably by stranded cables (wire ropes) 26 having flattened fasteners 28 at each end pivotally connected by screws or the like 30 to bridges 32 extending between the flanges of the associated arm channels. Although other flexible couplings, such as chains, may be employed to interconnect the arms, cables are preferred, because chain links tend to become tangled. Moreover, when stop abutments 34 are provided on the bridges to engage sides of the fasteners 28 when the arms are spread, as shown in FIG. 2, the cables immediately fold to the neat U-shaped configuration shown in FIG. 1 when the apparatus is collapsed, and there is no binding or other interference with the free collapsing or spreading of the arms.

Figure 2:
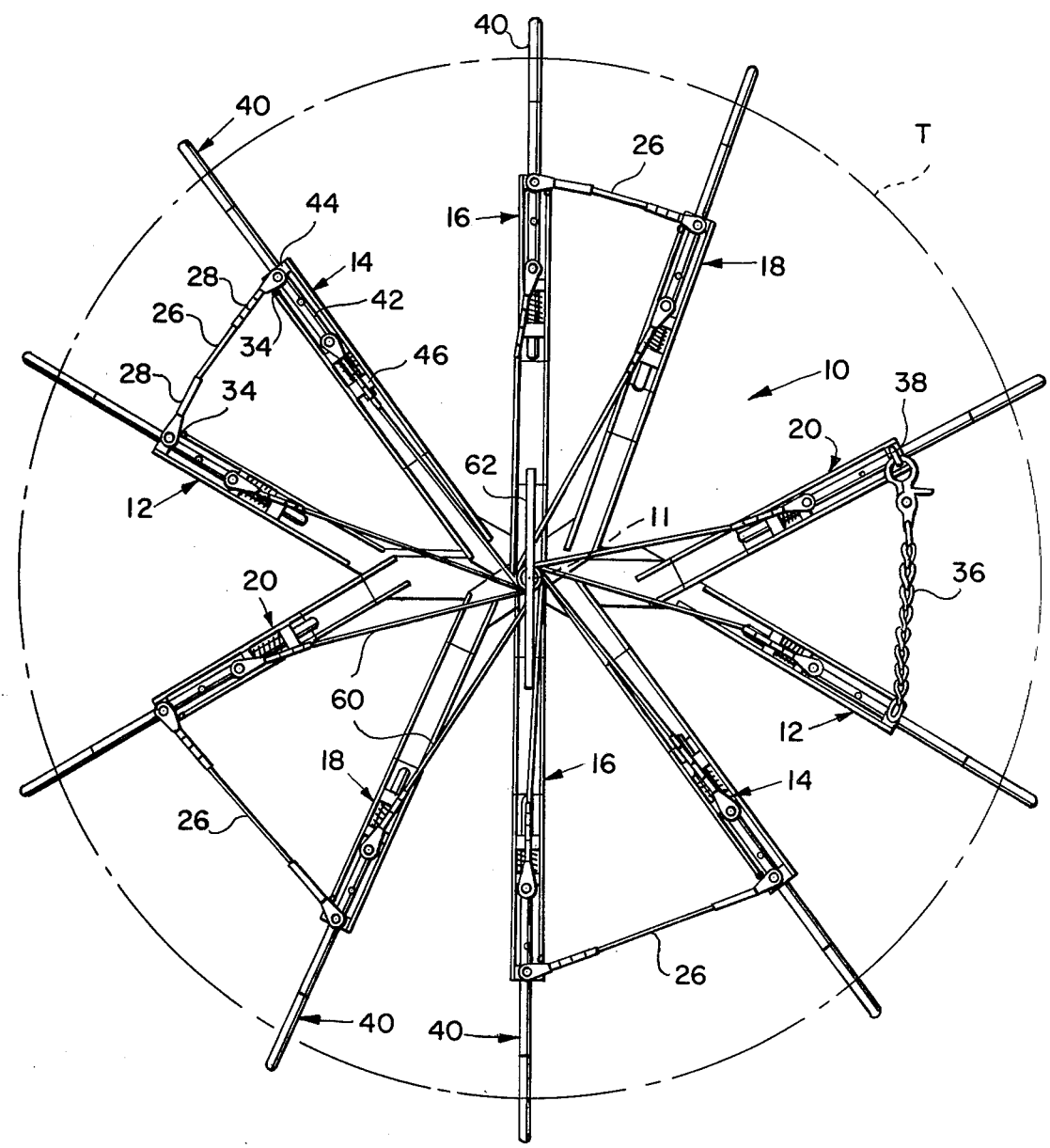
FIG. 2 is a side elevation view of the apparatus of FIG. 1, but with the arms shown spread apart.

In the form of the invention illustrated in FIG. 1, there is a flexible coupling interconnecting arms 12 and 14 and a flexible coupling interconnecting arms 16 and 18 at one side of pivot 11, and there is a flexible coupling interconnecting arms 14 and 16 and a flexible coupling interconnecting arms 18 and 20 at the opposite side of the pivot. It is apparent that if the outer section of arm 20 at the top of FIG. 1 and the outer section of arm 12 at the bottom of FIG. 1 are turned toward each other about pivot 11, arm 20 moving clockwise (downward) and arm 12 counterclockwise (upward), all of the arms will be spread apart and deployed to the condition of FIG. 2, the lower part of arm 20 pulling arm 18 with it, and the upper part of arm 12 pulling arm 14 with it. A different interconnecting arrangement will be described later. In both arrangements it will be apparent that the flexible couplings interconnecting the arms permit all of the arms to be deployed to radiate over 360° merely by turning one arm relative to another through less than 180°. The spreading of the arms is limited by the interconnection between arms 16 and 18 and the interconnection between arms 14 and 16.

As shown in FIGS. 1 and 2, the central sections 24 of arms 12 and 20 are longer than the central sections of arms 14 and 18, with the length of the outer sections differing accordingly, to permit the arm assembly to be collapsed without interference between adjacent channels. When the arms are spread to the condition of FIG. 2, the spreading of the arms may also be limited by the engagement of the channels of arm 12 with the channels of arm 20. When the arms are fully spread, they may be retained in that condition by a further flexible coupling 36, such as a chain or further cable, one end of which is fixed to the channel of arm 12 and the other end of which may be releasably coupled by a spring-biased split ring to an eye 38 fixed to arm 20.

Opposite ends of the arms are provided with radially sliding J-rods 40. Each J-rod has a stem 42 reciprocatively supported in the associated arm channel by a pair of spaced bearing blocks 44 and 46 (see FIGS. 3 and 5) fixed to the channels and having aligned bores for receiving the J-rod stem. The outer bearing blocks 44 may be integral with the bridge pieces 32, if desired. As shown in FIG. 5, each J-rod stem has affixed thereto a rectangular collar 48 having side walls guided by corresponding side walls of associated channel. A coil compression spring 50 surrounds the stem in the space between the collar 48 and the bearing block 46 and urges the former away from the latter, so that the J-rods are biased radially outward. Outward movement of each J-rod may be limited by a pin 52 fixed to the J-rod and engageable with the bearing block 44. The free outer portion of each J-rod is generally perpendicular to the stem and generally parallel to the axis of the pivot 11 of the arms.

Normally the J-rods are biased radially outward to the phantom line position of FIG. 5, so that the effective diameter of the apparatus is sufficiently greater than the diameter of the tire T to permit easy installation of the apparatus. When the apparatus has been placed in position against the side of a wheel, the outer portions of the J-rods define a circle of diameter greater than the diameter of the tire, as shown in FIG. 2. To attach the apparatus to a wheel it is necessary to draw the J-rods inwardly against the tire, and for this purpose a tightening mechanism is employed, which is described hereinafter. The outer portions of the J-rods are preferably somewhat hook-shaped and may be flattened, roughened, cleated or otherwise formed to provide secure engagement with the tire and to provide enchanced traction on snow or ice.

As shown in FIG. 4, the tightening mechanism, generally designated by reference character 54, comprises a hub 56 rotatable about the axis A of pivot 11. The hub is supported in a bearing sleeve 58 fixed to arm 16 and has a plurality of cables 60 associated therewith. One end of each cable is fixed to the hub and the other end is fixed to the collar 48 of an associated J-rod, preferably by means of a pivotally connected flattened fastener. Hub 56 may be turned by means of a handle 62 (preferably fixed to the hub) so as to wind all of the cables 60 onto the hub simultaneously and to draw all of the J-rods 40 radially inward simultaneously against the bias of springs 60. Bearing sleeve 58 is provided with a conventional pawl and ratchet mechanism (not shown), which maintains the position of hub 56 when it is turned to wind up the cables 60 and which releases the hub for reverse rotation when a conventional release element 64 is operated. The tightened mechanism may be based upon a conventional socket wrench drive unit, for example.

Figure 6:
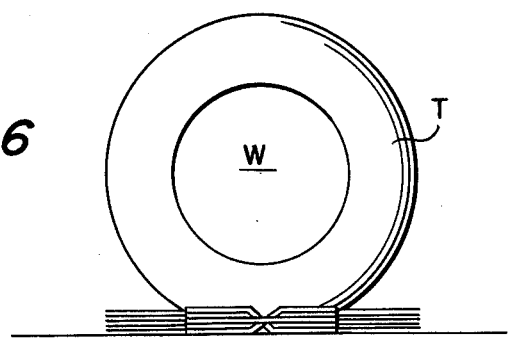
FIGS. 6, 6A–11 are diagrammatic views illustrating the manner in which apparatus of the invention may be applied to a vehicle wheel.
Figure 6A:
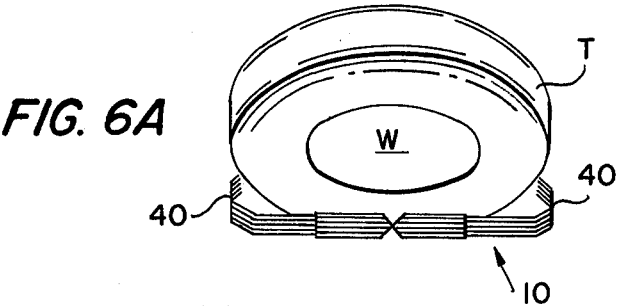
Figure 8:
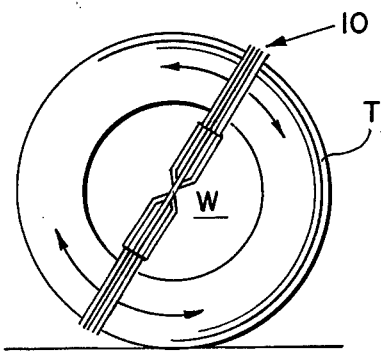
Figure 7:
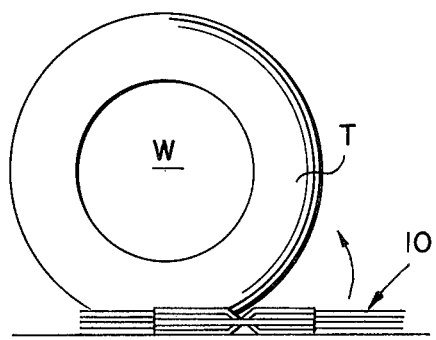
Figure 9:
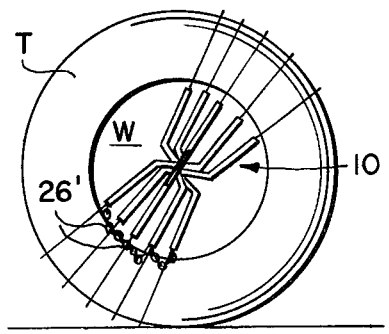
Figure 10:
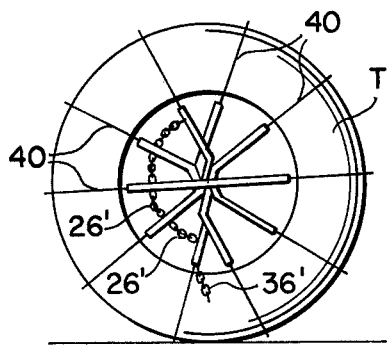
Figure 11:
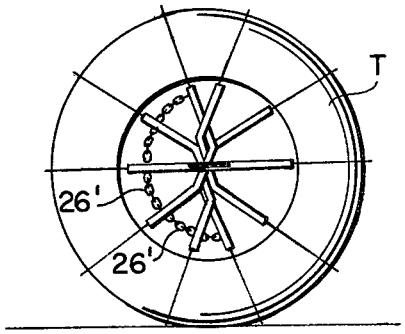
Figure 12:
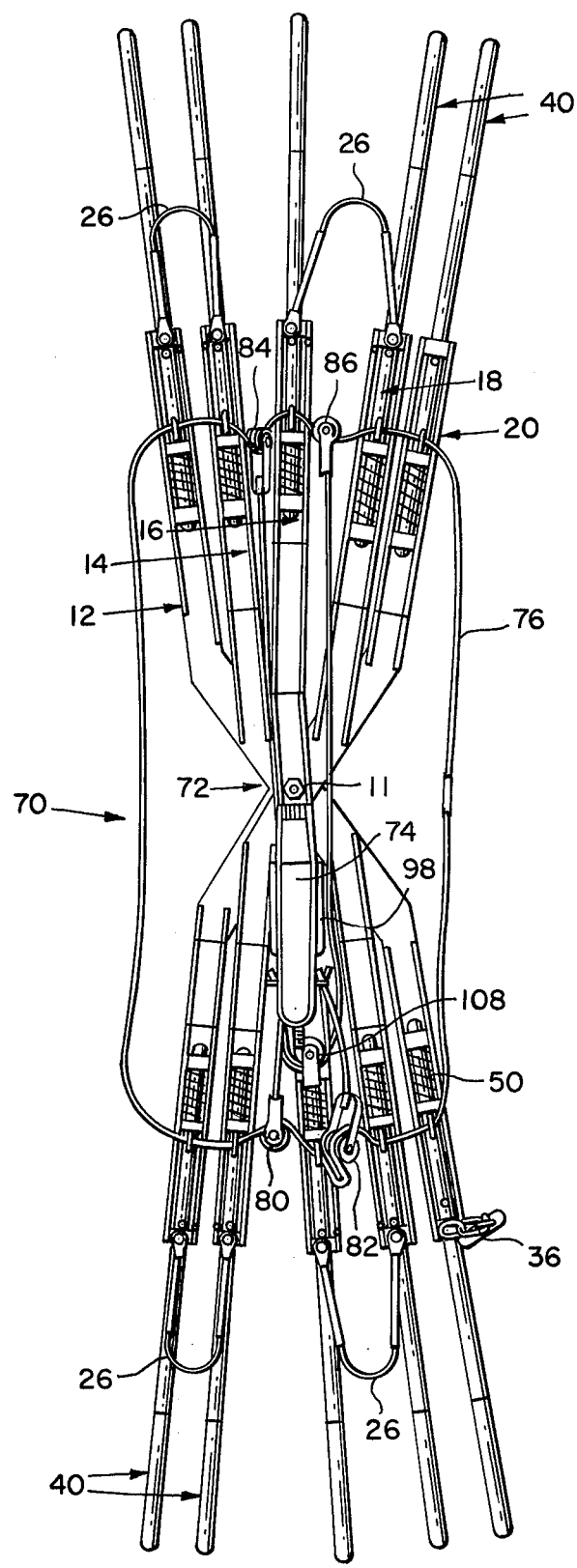
FIG. 12 is a view similar to FIG. 1, but of a second embodiment, with a different central tightening mechanism.
Figure 13:
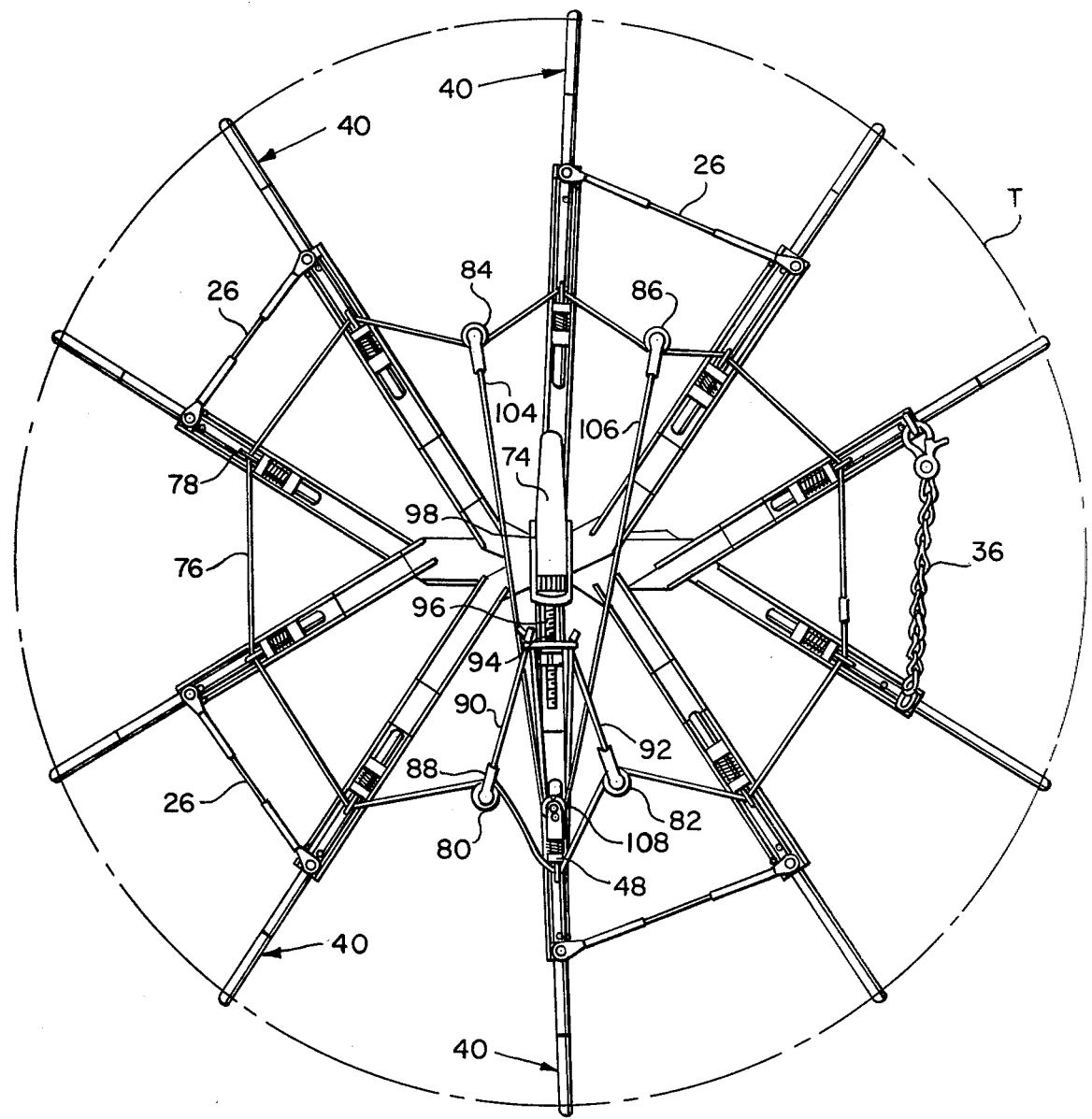
FIG. 13 is a view similar to FIG. 2, but of the second embodiment.

FIGS. 6-11 illustrate the manner in which the apparatus of the invention may be readily installed upon a vehicle wheel. The apparatus is shown in diagrammatic form, with a somewhat different arm interconnecting arrangement, which will be described presently. As shown in FIG. 6, the collapsed apparatus 10 is placed upon the ground adjacent to the wheel W, upon which the tire T is mounted, the outer ends of the J-rods 40 being oriented toward the wheel, as indicated in FIG. 6A. The apparatus is then moved forwardly or rearwardly of the vehicle to the position of FIG. 7. The end farthest from the wheel is then lifted and turned, as indicated by the arrow in FIG. 7, to the position of FIG. 8. Then the arms are simply spread apart in the manner previously described, as indicated in FIGS. 8 and 9, until the arms are deployed to the position of FIG. 10.

In this modification shown, the arms are interconnected by flexible couplings 26' all of which are located at one side of the pivot (the flexible couplings being diagrammatically shown as chains). After the arms have been deployed to the position of FIG. 10, coupling 36 is engaged to retain the arms in that position. Then the J-rod tightening mechanism (not shown in FIGS. 6–11) is actuated as described previously.

A second embodiment of the invention, shown in FIGS. 12–15, is essentially the same as the first embodiment, except for the tightening mechanism. The second embodiment, 70, employs a tightening mechanism generally designated by reference character 72, comprising a toggle lever 74 and associated parts for applying tension to a continuous flexible member, such as a stranded cable 76 threaded in sequence through eyes 78 fixed to the collars 48 of the J-rods. Tension is applied to the cable via four pulleys 80-86 rotatable on bifurcated supports 88 which embrace th cable 76. Pulleys 80 and 82 are connected to one end of further cables 90 and 92, respectively, the other end of which is fixed to a bar 94. Bar 94 is adjustably positioned upon a threaded rod 96 projecting from the bight of a U-shaped yoke 98, the arms of which are pivotally connected at 100 to opposite sides of lever 74. The lever is pivotally mounted at 102 upon the central section of arm 16.

Figure 14:
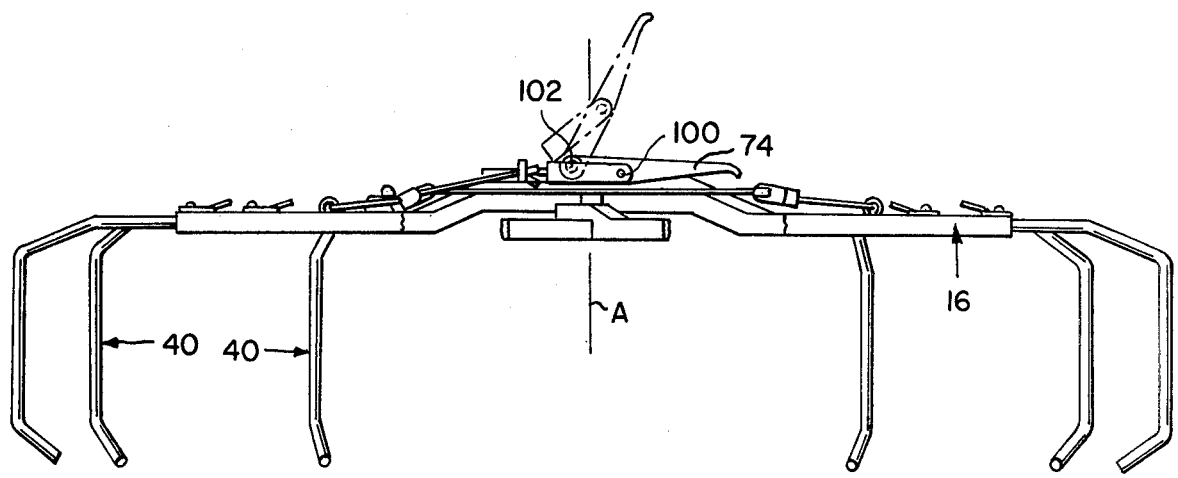
FIG. 14 is a plan view of the second embodiment, partly broken away.
Figure 15:
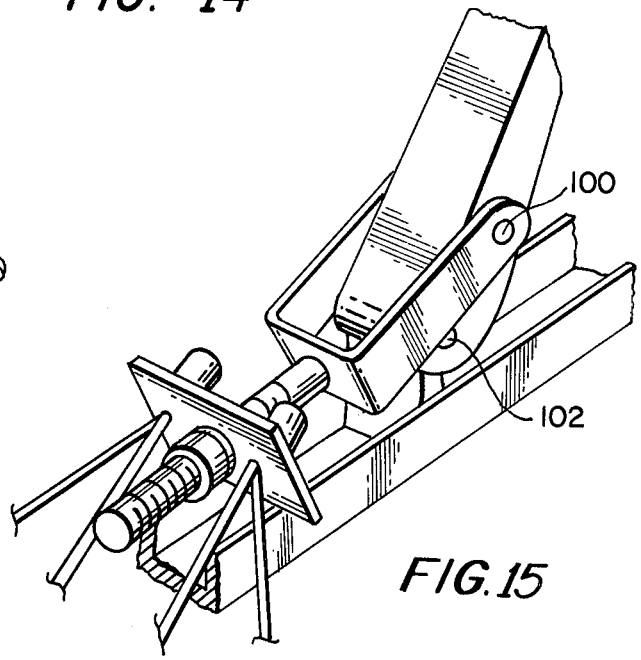
FIG. 15 is a fragmentary perspective view illustrating part of the tightening mechanism of the second embodiment.

When lever 74 is moved from the position of FIG. 15 to the posiion illustrated in FIG. 14, essentially flat against arm 16, pivot 100 of yoke 98 is moved so as to pull bar 94, cables 90 and 92 and pulleys 80 and 82, thereby deforming cable 76 and applying tension thereto. This tension draws the collars 48 of the J-rods radially inward against bias springs 50. The tension is increased by connecting pulleys 84 and 86 to further cables 104 and 106 which pass oppositely around double pulley 108 rotatably mounted on arm 16 and which are also secured to bar 94. When lever 74 is moved to a release position, as illustrated in FIG. 15, yoke 98 and bar 94 are moved so as to release the tension on cable 76.

Figure 16:
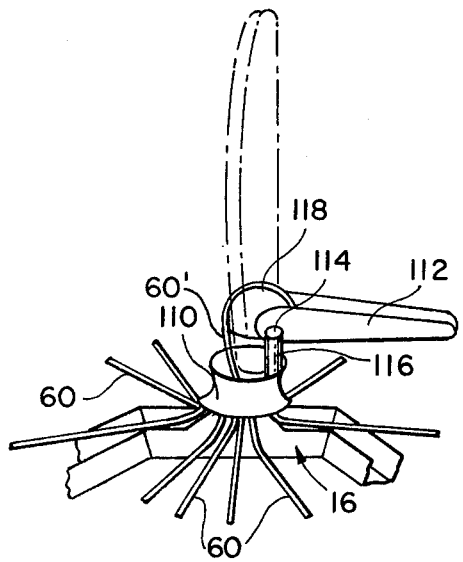
FIG. 16 is a fragmentary perspective view illustrating another tightening mechanism.

FIG. 16 illustrates a further modification of the tightening mechanism. In this modification each of the cables 60 in the first embodiment passes under a ring 110 centrally supported on arm 16 and is fixed to a further cable 60'. A lever 112 is pivotally supported at 114 on brackets 116 projecting from ring 110 and has a grooved eccentric portion 118 about which cable 60' is trained, one end of that cable being fixed to the lever 112. In the full line position illustrated in FIG. 16 tension is applied to cable 60' and cables 60, while in the phantom line position the eccentric is moved toward ring 110 to release the tension. A latch (not shown) may be employed to hold the lever 112 in the full line position.

Figure 17:
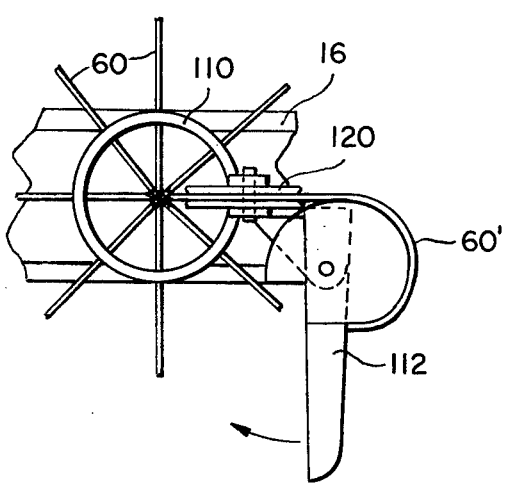
FIG. 17 is a fragmentary side elevation view of still another tightening mechanism.

Instead of mounting lever 112 above ring 110 as shown in FIG. 16, it may be mounted at one side of the ring as shown in FIG. 17, being moved in the direction of the arrow in FIG. 17 to tighten the cables and in the opposite direction to loosen the cables. Again, a latch for lever 112 may be provided. If desired, an additional pulley 120 may be provided to guide the cable 60' from ring 110.

From the foregoing description it is apparent that the invention provides emergency traction apparatus that is simple in construction and application. The apparatus is easily installed without moving the vehicle, even when much of the wheel and tire is covered or obscured. Installation does not require reaching behind the tire and does not require the assembly of multiple parts or the use of tools. A sufficient number of traction elements (J-rods) is provided for adequate traction, and yet all those elements may be deployed by relative turning of only two of the arms. The installed apparatus is securely held against the tire tread, resisting centrifugal force, yet has sufficient flexibility (by virtue of the separately movable J-rods and the biasing springs) to accommodate flattening of the tire against the pavement and to accommodate tire wear. Since the orientation of the J-rods relative to the associated arms is fixed by the guiding relationship between the J-rod collars and the associated channels, turning of the J-rods about the stem axes is prevented, thereby resisting the effects of vehicle acceleration, wheel motion, and power application and braking, and of course, facilitating application of the apparatus to the wheel.

While preferred embodiments have been shown and described, it will be apparent to those skilled in the art that changes can be made without departing from the principles and spirit of the invention, as defined in the following claims.

I claim:

1. Traction apparatus for attachment to a vehicle wheel, said apparatus comprising at least three generally diametrical arms, with each arm extending entirely across the diameter of said wheel, with central sections of said arms connected to a common pivot having an axis about which said arms may be turned to form an arm assembly that may be collapsed or spread, flexible coupling means interconnecting said arms for spreading all of said arms from a collapsed condition of said arm assembly to radiate over 360° when one of said arms is in said collapsed assembly turned relative to another of said arms in said collapsed assembly through less than 180°, and means for keeping said arms spread apart, said arms having outer sections with associated traction elements engageable with a vehicle tire.

2. Traction apparatus in accordance with claim 1, wherein at least some of said arms are generally Z-shaped as projected on a plane perpendicular to the axis of said pivot to facilitate the compact collapse of said arm assembly.

3. Traction apparatus in accordance with claim 1, wherein said flexible coupling means comprises cables interconnecting said arms in pairs, said cables having fasteners at their ends pivotally connected to the associated arms and provided with stop means on the associated arms engaging the fasteners for causing the cables to bend in a predetermined manner when the arm assembly is collapsed.

4. Traction apparatus in accordance with claim 1, wherein said traction elements are slidably mounted upon the ends of the associated arms and project therefrom substantially radially.

5. Traction apparatus in accordance with claim 4, further comprising spring biasing means for normally urging said traction elements substantially radially outward of the associated arms, and tightening means located substantially centrally of said arm assembly for moving said traction elements substantially radially inward.

6. Traction apparatus in accordance with claim 5, wherein said tightening means comprises cable means connected to said traction elements.

7. Traction apparatus in accordance with claim 6, wherein said cable means comprises a plurality of cables having one end thereof attached to associated traction elements, and wherein said tightening means further comprises rotatable means attached to the opposite end of said cables for releasibly winding said cables thereon.

8. Traction apparatus in accordance with claim 6, wherein said cable means comprises a cable connected in sequence to each of said traction elements, and wherein said tightening means further comprises means for applying tension to said cable.

9. Traction apparatus in accordance with claim 8, wherein the last-mentioned means comprises a toggle mechanism coupled to said cable.

10. Traction apparatus in accordance with claim 6, wherein said cable means comprises a plurality of cables each of which has an end attached to an associated traction element, and wherein said tightening means further comprises a lever-actuated eccentric connected to said cables.

11. Traction apparatus in accordance with claim 4, wherein said traction elements have free outer portions oriented substantially parallel to the axis of said pivot, and further comprising means for maintaining that orientation.

12. Traction apparatus in accordance with claim 11, wherein the last-mentioned means comprises means for guiding the movement of each traction element with respect to the associated arm.

13. Traction apparatus in accordance with claim 1, said arm assembly comprising one arm that is substantially straight as projected upon a plane perpendicular to the axis of said pivot and second and third arms, generally oppositely Z-shaped at opposite sides of said one arm as projected upon said plane.

14. Traction apparatus in accordance with claim 13, wherein said arm assembly comprises fourth and fifth arms, generally oppositely Z-shaped as projected upon said plane, and located at the side of said second and third arms, respectively, remote from said one arm.

15. Traction apparatus in accordance with claim 14, wherein said fourth and fifth arms have central sections substantially longer than corresponding central sections of said second and third arms.

16. Traction apparatus in accordance with claim 15, wherein said arms are bent, as projected upon planes containing said axis, so the outer sections of said arms lie in substantially the same plane perpendicular to said axis.

* * * * *